United States Patent Office 2,960,501
Patented Nov. 15, 1960

2,960,501

2α METHYL-11β-HYDROXY-17α,21-EPOXY-4-PREGNENE-3,20-DIONE

Frank H. Lincoln, Kalamazoo, and William P. Schneider, Kalamazoo Township, Kalamazoo County, Mich., assignors to The Upjohn Company, Kalamazoo, Mich., a corporation of Delaware No Drawing. Filed Apr. 22, 1959, Ser. No. 808,013

1 Claim. (Cl. 260—239.55)

This invention relates to certain novel steroids, more particularly to 2α - methyl - 11β-hydroxy-17α,21-epoxy-4 - pregnene-3,20-dione, 2α-methyl-17α,21-epoxy-4-pregnene-3,11,20-trione, and the corresponding 9α-fluoro compounds. These compounds and a process for their production may be represented by the following formulae:

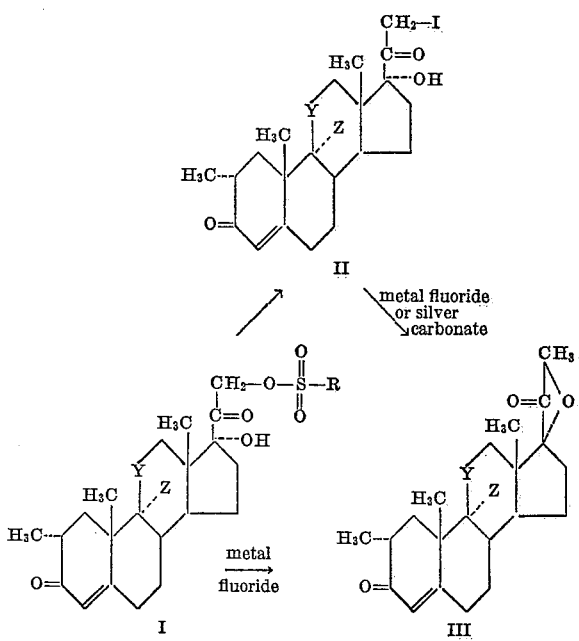

wherein Y is β-hydroxymethylene or carbonyl, Z is hydrogen or fluorine and R is an alkyl or aryl group, preferably a hydrocarbon alkyl or hydrocarbon carbocyclic aryl, preferably containing from 1 to 12 carbon atoms, inclusive.

The compounds represented by Formula III are diuretic and potassium and sodium regulating agents of improved therapeutic ratio. Further, the compounds of this invention exhibit a higher glycogen-depositing to anti-inflammatory ratio. They are useful in the regulation of pituitary secretion and as central nervous system regulators.

The products of this invention are prepared by reacting a compound represented by Formula I or II with metal fluoride, preferably silver fluoride. Also reacting the 21-iodo compound (II) with silver carbonate produces a high yield of III. These compounds are conveniently isolated from the 21-fluoro compounds concomitantly produced by chromatographing the solids from the reaction product, e.g., over magnesium silicate, and developing the column with increasingly polar solvents. Then the desired fraction, which is in the early elution fractions, is preferably recrystallized to remove any significant amounts of impurities remaining. Alternatively, the total reaction product can be fractionally crystallized until a pure compound represented by Formula III is obtained. These pure compounds can then be converted, if desired, into pharmaceutical compositions in which a pharmaceutical carrier or diluent is added or the compound otherwise prepared for pharmaceutical use, e.g., oral or intramuscular. Administration can be in conventional dosage forms, e.g., pills, tablets, capsules, syrups or elixirs for oral use or liquid forms which are adaptable for injectable products with or without coacting materials forming advantageous combinations therewith.

This application is a continuation-in-part of our copending application Serial No. 685,375, filed September 23, 1957.

The following preparations and examples are illustrative of the process and products of the present invention, but are not to be construed as limiting.

PREPARATION 1

2α-methyl-11β,17α,21-trihydroxy-4-pregnene-20-one 21-methanesulfonate

A solution of 5.00 g. (13.2 mM.) of 2α-methyl-11β,17α,21-trihydroxy-4-pregnene-3,20-dione in 20 ml. of pyridine was cooled to 0° C. and 1.6 ml. of methanesulfonyl chloride slowly added. After the mixture was held for a period of 4 hours at 0 to 5° C., ice and sufficient dilute hydrochloric acid to neutralize the pyridine were added and the mixture extracted with methylene chloride. The extract was washed with cold sodium bicarbonate solution, dried over sodium sulfate and evaporated at reduced pressure. A yield of 5.69 g. (96%) of a gummy product was obtained which crystallized from acetone-hexane hydrocarbons (Skellysolve B) as large prisms melting at 184 to 186° C.

PREPARATION 2

2α-methyl-17α,21-dihydroxy-4-pregnene-3,11,20-trione 21-methanesulfonate

In the same manner as indicated in Preparation 1, but substituting 2α-methyl-17α,21-dihydroxy-4-pregnene-3,11,20-trione (I) as the starting material, there is produced 2α - methyl-17α,21-dihydroxy-4-pregnene-3,11,20-trione 21-methanesulfonate.

PREPARATION 3

2α-methyl-9α-fluoro-11β,17α,21-trihydroxy-4-pregnene-3,20-dione 21-methanesulfonate A solution of 3.00 g. (7.9 mM.) of 2α-methyl-9α-fluoro-11β,17α,21-trihydroxy-4-pregnene-3,20-dione in 40 ml. of pyridine was cooled to 0° C. and treated with 1.2 g. (10.2 mM.) of methanesulfonyl chloride. After 72 hours at 0 to 5° C., sufficient ice cold aqueous hydrochloric acid was added to neutralize the pyridine, and the mixture was then extracted with methylene chloride, which was then washed with aqueous sodium bicarbonate followed by water and then dried over sodium sulfate. Evaporation at reduced pressure gave 2.90 g. of a partially crystalline residue consisting essentially of 2α-methyl-9α-fluoro - 11β,17α,21 - trihydroxy - 4 - pregnene - 3,20-dione 21-methanesulfonate.

PREPARATION 4

2α-methyl-9α-fluoro-17α,21-dihydroxy-4-pregnene-3,11,20-trione 21-methanesulfonate Following the procedure of Preparation 3, but substituting 2α - methyl-9α-fluoro-17α,21-dihydroxy-4-pregnene-3,11,20-trione as the starting material, there is produced 2α - methyl - 9α-fluoro-17α,21-dihydroxy-4-pregnene-3,11,20-trione 21-methanesulfonate.

PREPARATION 5

2α-methyl-21-iodo-11β,17α-dihydroxy-4-pregnene-3,20-dione

A solution of 5.00 (11.0 mM.) of 2α-methyl-11β,17α,21-trihydroxy-4-pregnene-3,20-dione 21-methanesulfonate in 100 ml. of acetone was treated with a solution of 5.0 g. of sodium iodide in 50 ml. of acetone and the resulting mixture distilled for 15 minutes at atmospheric pressure. At this point, the mixture had been concentrated to approximately one-third its original volume and was thick with a gelatinous precipitate. Ice and 400 ml. of water were added with stirring. The product was collected on a filter, washed with water and dried at room temperature. A yield of 4.82 g. (90.2%) of yellowish crystals of 2α-methyl-21-iodo-11β,17α-dihydroxy-4-pregnene-3,20-dione melting at 138 to 140° C. (with decomposition) was obtained. A portion was recrystallized from acetone-water, giving colorless prisms melting indefinitely at 138 to 142° C. (with decomposition).

PREPARATION 6

2α-methyl-9α-fluoro-21-iodo-11β,17α-dihydroxy-4-pregnene-3,20-dione

A solution of 2.50 g. (5.29 mM.) of 2α-methyl-9α-fluoro-11β,17α,21-trihydroxy-4-pregnene-3,20-dione 21-methanesulfonate in 50 ml. of acetone was treated with a solution of 2.50 g. of sodium iodide in 50 ml. of acetone. The mixture was boiled with stirring for 15 minutes, at which time the volume of the mixture was found to have been reduced by about one-half. Ice and water were added, and the resulting crystalline product was washed with water and air dried. A yield of 1.89 g. of 2α-methyl-9α-fluoro-21-iodo-11β,17α-dihydroxy-4-pregnene-3,20-dione melting at 161 to 163° C. (with decomposition) was obtained.

Following the procedure of Preparations 5 and 6, but substituting 2α-methyl-17α,21-dihydroxy-4-pregnene-3,11,20-trione 21-methanesulfonate and 2α-methyl-9α-fluoro-17α,21-dihydroxy-4-pregnene-3,11,20-trione as the starting compounds, there is thus produced 2α-methyl-21-iodo-17α-hydroxy-4-pregnene-3,11,20-trione and 2α-methyl-9α-fluoro-21-iodo-17α-hydroxy-4-pregnene-3,11,20-trione, respectively.

EXAMPLE 1

2α-methyl-11β-hydroxy-17α,21-epoxy-4-pregnene-3,20-dione

A solution of 4.50 g. (9.26 mM.) of 2α-methyl-21-iodo-11β,17α-dihydroxy-4-pregnene-3,20-dione in 500 ml. of acetonitrile was warmed to 40° C. with stirring and treated with 3 ml. of a 50% aqueous solution of silver fluoride. A yellowish brown precipitate developed which rapidly turned dark brown. The flask was wrapped with a dark cloth to protect the contents from light, and stirring was continued for 30 minutes. Additional silver fluoride solution was then added in three 2-ml. portions at 30-minute intervals. Stirring was continued while the reaction mixture was maintained at approximately 40° C. for a total reaction time of 4 hours. The mixture was then concentrated to a syrup at reduced pressure and extracted with three 125-ml. portions of warm methylene chloride and three 125-ml. portions of warm acetone. Evaporation of the acetone yielded 1.29 g. of gray crystals. The combined methylene chloride extract was chromatographed on 200 g. of magnesium silicate (Florisil). The column was eluted with 1500 ml. of hexane hydrocarbons (Skellysolve B) plus 10% acetone, 2400 ml. of hexanes plus 12.5% acetone, 3000 ml. of hexanes plus 15% acetone, 1200 ml. of hexanes plus 20% acetone, and 300 ml. of acetone. The eluate was collected in 300-ml. fractions and evaporated.

Fractions 2 through 4 from the above column contained 847 mg. of 2α-methyl-11β-hydroxy-17α,21-epoxy-4-pregnene-3,20-dione which recrystallized from a mixture of acetone and hexanes to give long needles melting at 149 to 151° C.

Fractions 6 through 26 contained 0.99 g. of a crystalline material which was combined with the aforementioned 1.29 g. of gray crystals from the acetone extract and recrystallized twice from acetone to give 2α-methyl - 21 - fluoro - 11β,17α - dihydroxy-4-pregnene-3,20-dione melting at 244 to 247° C.

EXAMPLE 2

2α-methyl-17α,21-epoxy-4-pregnene-3,11,20-trione

Following the procedure indicated in Example 1, but substituting 2α-methyl-21-iodo-17α-hydroxy-4-pregnene-3,11,20-trione as the starting steroid, there is thus produced 2α-methyl-17α,21-epoxy-4-pregnene-3,11,20-trione.

EXAMPLE 3

2α-methyl-9α-fluoro-11β-hydroxy-17α,21-epoxy-4-pregnene-3,20-dione

A solution of 1.80 g. (3.56 mM.) of 2α-methyl-9α-fluoro - 21-iodo-11β,17α-dihydroxy-4-pregnene-3,20-dione in 75 ml. of acetonitrile was heated and then cooled to 40° C. The mixture was protected from light and two 1.5-ml. portions and one 0.6-ml. portion of 50% aqueous silver fluoride solution were added in that order at one-hour intervals. The temperature was maintained at approximately 40° C. and stirring was continued to a total reaction time of 4 hours. The dark mixture was then concentrated at reduced pressure nearly to dryness and the residue extracted successively with three 50-ml. portions of warm methylene chloride. The methylene chloride extract was chromatographed on 75 g. of magnesium silicate (Florisil). The column was then eluted with 1000 ml. of hexanes plus 12% acetone, 1400 ml. of hexanes plus 15% acetone, 800 ml. of hexanes plus 20% acetone, and 200 ml. of acetone. The eluate was collected in 200-ml. fractions and evaporated.

Fractions 2 through 4 from the above column contained 2α - methyl-9α-fluoro-11β-hydroxy-17α,21-epoxy-4-pregnene-3,20-dione which was further purified by recrystallization from a mixture of hexanes and acetone.

Fractions 5 through 8 contained 0.35 g. of crystalline material which was recrystallized from acetone to yield 0.23 g. of 2α-methyl-9α,21-difluoro-11β,17α-dihydroxy-4-pregnene-3,20-dione as shiny plates melting at 260 to 264° C. (with decomposition).

EXAMPLE 4

2-methyl-9-fluoro-17,21-epoxy-4-pregnene-3,11,20-trione

Following the procedure of Example 3, but substituting 2α - methyl - 9α-fluoro-21-iodo-17α-hydroxy-4-pregnene-3,11,20-trione as the starting material, there is produced 2α - methyl - 9α-fluoro-17α,21-epoxy-4-pregnene-3,11,20-trione.

We claim:

2α - methyl-11β-hydroxy-17α,21-epoxy-4-pregnene-3,20-dione.

References Cited in the file of this patent

UNITED STATES PATENTS

| | | |
|---|---|---|
| 2,836,593 | Beyler et al. | May 27, 1958 |
| 2,865,915 | Bailey et al. | Dec. 23, 1958 |

OTHER REFERENCES

Herz et al.: J. Am. Chem. Soc., vol. 78 (Sept. 20, 1956), pp. 4812–4814.

Hirschmann et al.: J. Am. Chem. Soc., vol. 78 (Sept. 20, 1956), p. 4814.